United States Patent [19]

Ozaki

[11] Patent Number: 5,423,515
[45] Date of Patent: Jun. 13, 1995

[54] SOCKET OF PIPE JOINT

[75] Inventor: Yoshikazu Ozaki, Tokyo, Japan

[73] Assignee: Nitto Kohki Co., Ltd., Tokyo, Japan

[21] Appl. No.: 271,751

[22] Filed: Jul. 7, 1994

[30] Foreign Application Priority Data

Oct. 25, 1993 [JP] Japan .................. 5-266477

[51] Int. Cl.6 .......................................... F16L 37/28
[52] U.S. Cl. ................................................ 251/149.6
[58] Field of Search ............... 137/614.04; 251/149.6

[56] References Cited

U.S. PATENT DOCUMENTS

| 4,848,728 | 7/1989 | Ekman | 251/149.6 |
| 4,863,201 | 9/1989 | Carstens | 251/149.6 |
| 5,290,009 | 3/1994 | Heilmann | 251/149.6 |

FOREIGN PATENT DOCUMENTS

| 51-34023 | 8/1976 | Japan . |
| 54-34121 | 3/1979 | Japan . |
| 1054520 | 11/1965 | United Kingdom . |

Primary Examiner—A. Michael Chambers
Attorney, Agent, or Firm—Nixon & Vanderhye

[57] ABSTRACT

A socket of a pipe joint has a socket body, coupled to an end portion of a first fluid pipe, for removably receiving a plug coupled to an end portion of a second fluid pipe to be coupled to the first fluid pipe, a valve mechanism provided within the socket body and situated in an open position to allow passage of a fluid between the socket body and the plug when the plug is inserted in the socket body, and a lock mechanism for preventing removal of the plug from the socket body when the valve mechanism is situated in the open position. A hollow cylindrical valve receiving portion having a valve seat formed on an inner peripheral surface of the valve receiving portion, a valve body slidably situated within the valve receiving portion and having a valve head cooperating with the valve seat to constitute the valve mechanism, and a spring, supported by the valve receiving portion, for urging the valve body in a direction to bring the valve head into contact with the valve seat are constructed as a single assembly capable of being inserted in the socket body.

7 Claims, 1 Drawing Sheet

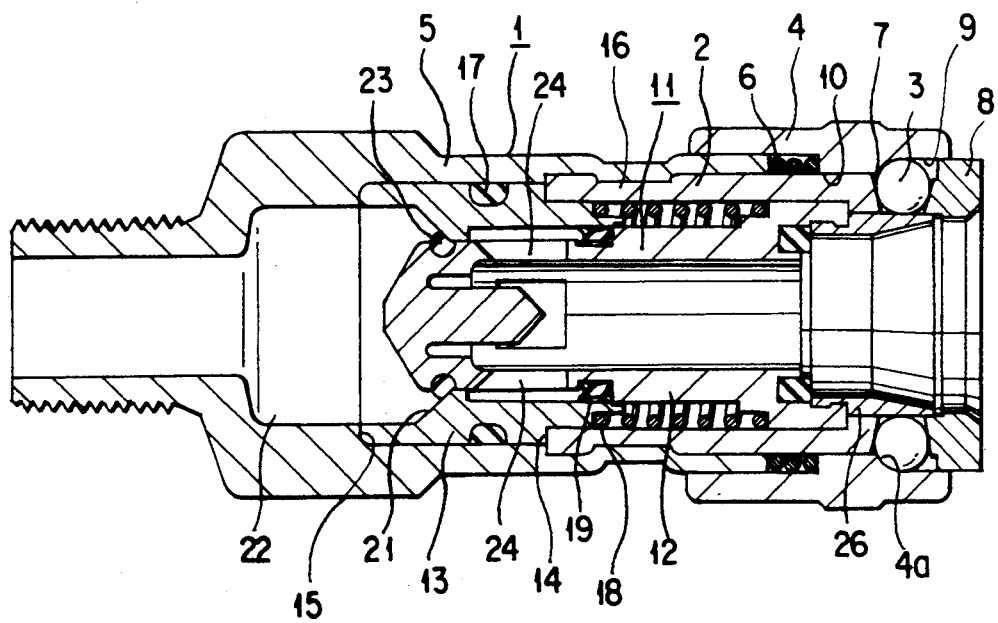
F I G. 1
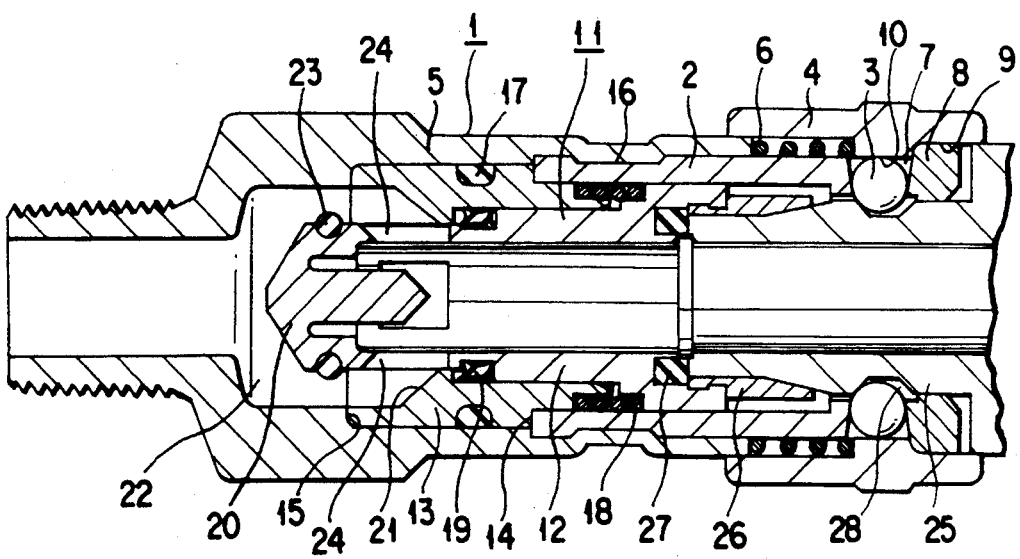
F I G. 2

SOCKET OF PIPE JOINT

BACKGROUND OF THE INVENTION

1. Field of the Invention

The present invention relates to a pipe joint for removably coupling a socket and a plug by means of lock balls provided in the socket by actuating an operating sleeve.

2. Description of the Related Art

A great number of pipe joints comprising a socket having lock balls, which are pressed or released by an operating sleeve, and a plug having engaging grooves in/from which the lock balls are engaged/disengaged have been manufactured and used. A socket having an operating sleeve and lock balls has a more complicated structure than a plug. In particular, a socket including a valve body has a further complicated structure and influences the manufacturing cost of the pipe joint.

This type of conventional socket of a pipe joint generally includes a valve receiving portion fixed on the inner periphery of the socket, a valve body urged by a spring at the time of coupling to come into contact with a valve seat and to close a fluid passage, and a lock ball receiving portion for preventing lock balls from projecting out of the inner peripheral surface of the socket. These components are generally formed separately and not integrated (Jap. U.M. Appln. KOKAI No. 51-34023).

The assembly of the pipe joint having the above structure is time-consuming and troublesome, resulting in a main factor of an increase in the manufacturing cost.

SUMMARY OF THE INVENTION

An object of the present invention is to provide a socket of a pipe joint wherein the assembly of the socket is made easier to decrease the manufacturing cost, and dust, etc. is prevented from entering a locking unit, thereby smoothing coupling/decoupling of the socket.

According to the present invention, there is provided a socket of a pipe joint, the socket having:

a socket body having a rear cylinder portion coupled to an end portion of a first fluid pipe and a front cylinder portion connected to the rear cylinder portion, the socket body removably receiving a plug coupled to an end portion of a second fluid pipe to be coupled to the first fluid pipe;

a valve mechanism provided within the socket body, normally situated in a closed position, and situated in an open position to allow passage of a fluid between the socket body and the plug when the plug is inserted in the socket body; and a lock mechanism, provided on the socket body, for preventing removal of the plug from the socket body when the valve mechanism is situated in the open position, the socket comprising:

a hollow cylindrical valve receiving portion provided within the socket body and having a valve seat formed on an inner peripheral surface of the valve receiving portion;

a valve body slidably situated within the valve receiving portion and having a valve head cooperating with the valve seat to constitute the valve mechanism; and a spring, supported by the valve receiving portion, for urging the valve body in a direction to bring the valve head into contact with the valve seat, wherein the valve receiving member, the valve body and the spring are constructed as a single assembly capable of being inserted in the socket body.

When this socket of the pipe joint is assembled, the valve receiving portion, valve body and spring are first assembled as a single sub-assembly. After the sub-assembly is inserted in the rear cylinder portion or front cylinder portion, the rear cylinder portion and front cylinder portion are fixed to each other. Thereby, the assembly process of the socket of the pipe joint is simplified, the working efficiency is enhanced, and the manufacturing cost is decreased. This assembly work is suitable to automation.

It is preferable that the front cylinder portion has an inner peripheral surface, an outer peripheral surface, and a plurality of radially extending through-holes penetrating the inner peripheral surface and the outer peripheral surface, the lock mechanism has a plurality of lock balls housed in the through-holes, the lock balls being allowed to project out of the inner peripheral surface, and an operating sleeve mounted on the outer peripheral surface of the front cylinder portion, the operating sleeve being movable between a lock position where the lock balls partially projecting out of the inner peripheral surface of the front cylinder portion are held, and a release position where the lock balls are contained in the through-holes, the plug can be coupled to and decoupled from the socket body in the release position, and the plug is prevented from being decoupled in the lock position. Thereby, the plug can be easily released only by actuating the operating sleeve. The plug can be locked by inserting it into the socket without actuating the sleeve.

It is preferable that the rear cylinder portion has a stepped hole with a shoulder portion, the valve receiving portion is positioned by the shoulder portion and the front cylinder portion in both directions along the axis of the valve receiving portion, and the valve body is supported by the front cylinder portion in the position in which the valve head is put in contact with the valve seat. In this case, the valve receiving portion and the valve body can easily be positioned.

It is preferable that when the lock mechanism includes a spring for urging the operating sleeve to the lock position, the spring is provided with a predetermined urging force when the operating sleeve (4) is situated in the release position. In this case, the spring can be easily positioned.

It is preferable that the valve body has a lock ball receiving portion situated on the axially opposite side to the valve head, the lock ball receiving portion closing the radially extending through-holes on the inner peripheral side of the front cylinder portion when the valve head comes in contact with the valve seat, and the lock ball receiving portion opening the radially extending through-holes to allow projection of the lock balls when the valve head moves away from the valve seat. When the plug is not coupled, dust, etc. is prevented from entering the radially extending through-holes form the inside of the front cylinder portion.

It is also preferable that the front cylinder portion has a projection extending circumferentially at an end portion thereof which is axially opposite to the rear cylinder portion, the operating sleeve has a lock ball pressing portion for pressing the lock balls radially inwards in the lock position to partially project the lock balls out of the inner peripheral surface of the front cylinder portion, a lock ball release portion for partially receiving the lock balls in the release position to prevent the lock balls from projecting out of the inner peripheral surface of the front cylinder portion, and a shoulder portion provided between the lock ball pressing portion and the lock ball release portion and engaged with the projection when the operating sleeve is situated in the lock position, and the lock ball release portion has such an axial length that part of the projection is covered by the lock ball release portion when the operating sleeve is in the release position. In this case, when the operating sleeve of the lock mechanism is situated in the release position, the two openings of each radially extending hole are closed, and no dust, etc. enters the radially extending holes. Thus, smooth coupling/decoupling of the plug is ensured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates a presently preferred embodiment of the invention and, together with the general description given above and the detailed description of the preferred embodiment given below, serves to explain the principles of the invention.

FIG. 1 is a vertical cross-sectional view showing an embodiment of the present invention; and FIG. 2 is a vertical cross-sectional view showing the state in which a plug is coupled to a socket shown in FIG. 1.

DETAILED DESCRIPTION OF THE PREFERRED EMBODIMENTS

An embodiment of the present invention will now be described with reference to the accompanying drawings.

In the figures, reference numeral 1 denotes a socket body. Numeral 2 denotes a front cylinder portion having lock balls 3 at a front portion thereof. An operating sleeve 4 for operating the lock balls 3 is slidably fitted on an outer peripheral portion of the front cylinder portion 2. Numeral 5 denotes a rear cylinder portion fitted on an outer peripheral portion of a rear part of the front cylinder portion 2. The rear cylinder portion 5 is fixed between the front cylinder portion 2 and the operating sleeve 4 with a spring 6 interposed. The front cylinder portion 2 and rear cylinder portion 5 constitute the socket body 1.

Lock ball engagement holes 7 are formed at a front end portion of the front cylinder portion 2. The lock balls 3 are loosely engaged in the lock ball engagement holes 7 so that the balls 3 can project from and retreat in the holes 7. In addition, the front end portion of the front cylinder portion 2 is provided with a large-diameter projecting portion 8 for preventing removal of the operating sleeve 4. It is desirable that each lock ball engagement hole 7 have a tapering shape so as to prevent the lock ball 3 from entering the inside of the front cylinder portion 2.

The operating sleeve 4 provided on the outer periphery of the front cylinder portion 2 is movable between a lock position where the sleeve 4 is moved forward by the spring 6 to press the lock balls 3 in the centripetal direction and a release position where the sleeve 4 retreats against the force of the spring 6 to release and move the lock balls 3 in the centrifugal direction. The inner periphery of the operating sleeve 4 includes a lock ball release portion 9 at its front portion and a lock ball pressing portion 10 at its rear portion, which are continuous with each other. The lock ball release portion 9 has such an inside diameter that the pressing of the lock balls 3 is released and moved in the centrifugal direction. The lock ball pressing portion 10 has such an inside diameter that the lock balls 3 are pressed in the centripetal direction.

The inside diameter of the front end portion of the operating sleeve 4, which constitutes the lock ball release portion 9, is substantially equal to the outside diameter of the large-diameter projecting portion 8 formed at the front end of the front cylinder portion 2. The operating sleeve 4 includes a shoulder portion 4a which is engaged with the large-diameter projecting portion 8 when the sleeve 4 is located in the lock position. The lock ball release portion 9 is slidably engaged with the large-diameter projecting portion 8. The length of the lock ball release portion 9 is set such that the front end of the lock ball release portion 9, i.e. the front end of the operating sleeve 4 is not axialy separated from the large-diameter projecting portion 8 when the sleeve 4 is retreated, the lock balls 3 located at the lock ball release portion 9 and the sleeve 4 is located in the release position.

Reference numeral 11 denotes a valve mechanism inserted and fixed in the socket body 1. The valve mechanism 11 comprises a cylindrical valve receiving portion 13 and a valve body slidably fitted 12 on the inner periphery of the valve receiving portion 13. The valve receiving portion 13 is clamped and fixed within the socket body 1 by a rear end portion 14 of the front cylinder portion 2 and a stepped portion 15 formed on an inner peripheral portion of the rear cylinder portion 5 fitted on the outer periphery of the front cylinder portion 2. Thus, the valve body 12 is positioned within the socket body 1. In this case, the spring force of the spring 6, provided between the operating sleeve 4 fitted on the outer periphery of the front cylinder portion 2 and the rear cylinder portion 5, for urging the sleeve 4 forwards, is set at a predetermined value which is necessary and sufficient to move the sleeve 4 forwards.

After the valve receiving portion 13 is clamped and fixed between the front cylinder portion 2 and rear cylinder portion 5, the rear cylinder portion 5 is caulked from the outside thereof, thereby fixing the rear cylinder portion 5 and front cylinder portion 2. A recess portion 16 is formed on the outer periphery of the front cylinder portion 2 just below the caulked portion of the rear cylinder portion 5. The caulked portion of the rear cylinder portion 5 is put in the recess portion 16 of the front cylinder portion 2. Thus, the rear cylinder portion 5 and front cylinder portion 2 are firmly fixed. The rear cylinder portion 5 and front cylinder portion 2 may be fixed by means of a screw.

Numeral 17 denotes a seal ring for sealing between the rear cylinder portion 5 and valve receiving portion 13. A spring 18 is fitted on the outer periphery of the valve body 12. The spring 18 is provided between the valve body 12 and valve receiving portion 13 and urges the valve body 12 forwards relative to the valve receiving portion 13. A seal ring 19 is provided to hold and seal the valve body 12 and valve receiving portion 13. A valve head 20 is formed at the rear end of the valve body 12. The valve head 20 is provided with a seal ring 23 which is put in and out of contact with a valve seat 21 formed on the inner periphery of the valve receiving portion 13, thereby opening and closing a fluid passage 22. Numeral 24 denotes a passage hole formed in a rear cylindrical wall of the valve body 12.

In the non-coupled state in which a plug 25 is not mounted in the socket body 1, the valve body 12 is moved forwards by the spring 18 and the valve head 20 comes in contact with the valve seat 21 to close the fluid passage. In the coupled state in which the plug 25 is mounted, a tip portion of the plug 25 inserted into the socket body 1 comes in contact with the a tip portion of the valve body 12. The valve body 12 is pushed by the plug 25 and retreated against the force of the spring 18, so that the valve head 20 moves away from the valve seat 21 to open the fluid passage 22.

Numeral 26 denotes a lock ball receiving portion fitted so as to clamp a seal ring 27 provided at the front end portion of the valve body 12. The lock ball receiving portion 26 is slidably engaged with the inside of the front cylinder portion 2 of the socket body 1. When the valve body 12 is in the non-coupled position (front position), the lock ball receiving portion 26 receives the lock balls 3 on its outer periphery and prevents the lock balls 3 from projecting out of the inner periphery of the socket body 1. The length of the lock ball receiving portion 26 is determined in the following manner. When the plug 25 is coupled, the lock ball receiving portion 26 retreats along with the retreating valve body 12 pushed by the plug 25 and is disengaged from the lock balls 3, so that the lock ball engagement holes 7 in which the lock balls 3 are engaged are completely opened. When the valve body 12 is located in the front position, i.e. when the plug 25 is in the non-coupled state, the lock ball engagement holes 7 are completely closed.

In the embodiment, the valve receiving portion 13 and valve body 12 are made of a resin material in order to reduce the manufacturing cost, and the lock ball receiving portion 26 is made of a steel material in order to maintain the durability. The lock ball receiving portion 26 may be formed integral with the valve body 12.

Reference numeral 28 denotes a lock ball engagement groove formed in the outer peripheral surface of the plug 25.

The socket of the pipe Joint according to the above embodiment is assembled in the following manner. The valve mechanism 11 is constructed such that the valve body 12 having the lock ball receiving portion 26 at its front end portion is integrally fitted in the valve receiving portion 13 with the spring 18 interposed. The valve mechanism 11 is inserted into the rear cylinder portion 5. In the state in which a rear stepped portion of the valve receiving portion 13 of the valve mechanism 11 is put in contact with the stepped portion 15 formed on the inner peripheral surface of the rear cylinder portion 5, the lock balls 3 are loosely engaged in the lock ball engagement holes 7 formed at the front end portion of the front cylinder portion 2. The operating sleeve 4 is fitted on the outer periphery of the front cylinder portion 2. The rear end portion 14 of the front cylinder portion 2 provided with the spring 6 is inserted in the rear cylinder portion 5, and the rear end portion 14 of the front cylinder portion 2 is put in contact with the rear cylinder portion 5. Thus, the rear cylinder portion 5 and front cylinder portion 2 are fixed and the valve receiving portion 13 is clamped. The valve mechanism 11 may first be inserted in the front cylinder portion 2 and then fixed by the rear cylinder portion 5.

Thereby, the valve receiving portion 13 is clamped and fixed by the rear cylinder portion 5 and front cylinder portion 2. The valve mechanism 11 is positioned, supported and fixed in the socket body 1 with the valve receiving portion 13 interposed. At the same time, the spring 6 for urging the operating sleeve 4 forwards is provided with a predetermined spring force. The rear cylinder portion 5 and front cylinder portion 2 are fixed by caulking the rear cylinder portion 5 from the outside thereof, so that the caulked portion of the rear cylinder portion 5 bites the outer periphery of the front cylinder portion 2. Since the recess portion 16 is formed on the outer periphery of the front cylinder portion 2 just below the caulked portion of the rear cylinder portion 5, the caulked portion of the rear cylinder portion 5 is put in the recess portion 16 and the rear cylinder portion 5 and front cylinder portion 2 are firmly fixed.

In the socket of the pipe joint assembled as described above, when the plug 25 is not coupled to the socket body 1, both the lock ball release portion 9 of operating sleeve 4 and the lock ball receiving portion 26 for supporting the lock balls 3 close the outer and inner openings of the lock ball engagement holes 7 formed in the front cylinder portion 2. Thus, when the plug 25 is in the non-coupled position, dust, etc. is prevented from entering the lock ball engagement holes 7, and smooth coupling/decoupling between the socket body 1 and plug 25 can be achieved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A socket of a pipe joint comprising:
   a socket body having a rear cylinder portion coupled to an end portion of a first fluid pipe and a separate front cylinder portion, said socket body removably receiving a plug coupled to an end portion of a second fluid pipe to be coupled to the first fluid pipe;
   a valve mechanism provided within the socket body, normally situated in a closed position, and situated in an open position to allow passage of a fluid between the socket body and the plug when the plug is inserted in the socket body; and
   a lock mechanism, provided on the socket body, for preventing removal of the plug from the socket body when the valve mechanism is situated in the open position,
   a subassembly forming part of said valve mechanism and receivable, within said socket body as a unitary subassembly including (i) a hollow cylindrical valve receiving member provided within the socket body and having a valve seat formed on an inner peripheral surface of the valve receiving member; (ii) a valve body slidably situated within the valve receiving member and having a valve head cooperable with said valve seat; and (iii) a spring supported by the valve receiving member, for urging the valve body in a direction to bring the valve head into contact with the valve seat, and means for connecting said front cylinder portion and said rear cylinder portion with said valve receiving member therebetween after said subassembly has been received within said socket body thereby locating said valve body in a predetermined position relative to said socket body.

2. The socket of the pipe joint according to claim 1, wherein said front cylinder portion has an inner peripheral surface, an outer peripheral surface, and a plurality of radially extending through-holes penetrating the inner peripheral surface and the outer peripheral surface, said lock mechanism has a plurality of lock balls housed in the through-holes, the lock balls being allowed to project out of said inner peripheral surface, and an operating sleeve mounted on the outer peripheral surface of the front cylinder portion, said operating sleeve being movable between a lock position where the lock balls partially projecting out of the inner peripheral surface of the front cylinder portion are held, and a release position where the lock balls are contained in the through-holes, said plug can be coupled to and decoupled from the socket body in the release position, and the plug is prevented from being decoupled in the lock position.

3. The socket of the pipe joint according to claim 1, wherein said rear cylinder portion has a stepped hole with a shoulder portion, said valve receiving member is positioned by the shoulder portion and the front cylinder portion in both directions along the axis of the valve receiving portion, and said valve body is supported by said front cylinder portion in the position in which the valve head is put in contact with the valve seat.

4. The socket of the pipe joint according to claim 2, further comprising a spring for urging the operating sleeve to the lock position, said spring being provided with a predetermined urging force when the operating sleeve is situated in the release position.

5. The socket of the pipe joint according to claim 2, wherein said valve body has a lock ball receiving portion situated on the axially opposite side to the valve head, said lock ball receiving portion closing the radially extending through-holes on the inner peripheral side of the front cylinder portion when the valve head comes in contact with the valve seat, and said lock ball receiving portion opening the radially extending through-holes to allow projection of the lock balls when the valve head moves away from the valve seat.

6. The socket of the pipe joint according to claim 5, wherein said lock ball receiving portion has an inner peripheral surface which is put in contact with an outer peripheral surface of the plug when the plug is received in the socket body.

7. The socket of the pipe joint according to claim 2, wherein said front cylinder portion has a projection extending circumferentially at an end portion thereof which is axially opposite to the rear cylinder portion, said operating sleeve has a lock ball pressing portion for pressing the lock balls radially inwards in the lock position to partially project the lock balls out of the inner peripheral surface of the front cylinder portion, a lock ball release portion for partially receiving the lock balls in the release position to prevent the lock balls from projecting out of the inner peripheral surface of the front cylinder portion, and a shoulder portion provided between said lock ball pressing portion and said lock ball release portion and engaged with said projection when the operating sleeve is situated in the lock position, and said lock ball release portion has such an axial length that part of the projection is covered by the lock ball release portion when the operating sleeve is in the release position.

* * * * *